United States Patent Office 2,899,449
Patented Aug. 11, 1959

2,899,449

PHOSPHATIDYL CHOLINE COMPOUNDS

André Debay, Paris, and Otto Sackur, Fontenay-aux-Roses, France, assignors to Societe Française de Recherches Biochimiques H. Besson & Cie. (Societe en Commandite par Actions), Paris, France, a company of France No Drawing. Application April 19, 1957
Serial No. 653,730

Claims priority, application France April 27, 1956

9 Claims. (Cl. 260—403)

Difficulties are experienced in isolating lecithins proper or phosphatidyl cholines, i.e. compounds dervied from higher fatty acids and choline glycerophosphoric esters, from vegetable and animal substances containing the same, in view of numerous impurities accompanying the compounds to be isolated. In industrial practice isolation has been made heretofore more or less successfully by means of organic solvents, particularly ethyl alcohol, ether and acetone, and with heat expenses which are not negligible.

It is an object of this invention to provide a process by means of which crude lecithins may be purified much more easily than in accordance with prior practice, without considerable heat expenses nor substantial losses of costly solvents.

A further object is to prepare from a source of lecithin, a phosphatidyl choline having a high degree of purity.

Another object is to produce a new phosphatidyl choline complex compound which is useful as such for diets or therapeutics, or as an emulsifying agent and which further provides a useful source of purified phosphatidyl choline.

Broadly stated we have discovered that by employing certain mineral compounds, particularly magnesium compounds, it is possible to purify crude lecithins in a simple way and thereby to recover phosphatidyl cholines having a high degree of purity.

Lecithins capable of being purified according to our invention may be of vegetable or animal origin; they may for example be obtained from soya-bean, peanut or corn, or from egg yolk, liver or brain.

According to this invention, we provide a process comprising the steps of contacting an impure phosphatidyl choline and a methanol solution of magnesium sulphate in the presence of so much ethanol as to cause the production of a precipitate containing both magnesium sulphate and phosphatidyl choline.

After isolating the precipitate thus produced, it is possible to separate highly purified phosphatidyl choline therefrom.

In order that the desired precipitate is formed, there should be at least as much ethanol as methanol in mutual presence. For practical purposes, with a view to effecting a substantially exhaustive extraction of phosphatidyl choline from the starting material, i.e. to causing phosphatidyl choline to pass substantially wholly into the precipitate, it is desirable to employ not less than 50 percent by weight of magnesium sulphate (reckoned as $MgSO_4 \cdot 7H_2O$) with respect to phosphatidyl choline. In order to be on the safe side, it is desirable to employ magnesium sulphate in excess over the 50 percent proportion, any excess being suitable.

With a view to avoiding the use of big amounts of ethanol, it is desirable to employ methanol by as small an amount as is compatible with the solubility of magnesium sulphate therein, i.e. to employ a saturated or almost saturated methanol solution of heptahydrated magnesium sulphate.

In carrying out the process of our invention, the methanol solution of magnesium sulphate may be added to an ethanol solution of impure phosphatidyl choline; however it may also be added to a methanol solution of phosphatidyl choline, after which the mixture is clarified then ethanol is added thereto for causing the required precipitation.

Throughout the specification and in the claims, the word "ethanol" is employed to embrace both anhydrous ethanol and ethyl alcohol containing at least 95 percent by volume of anhydrous ethanol.

The starting ethanol or methanol solution of impure phosphatidyl choline may be a solution of a crude lecithin previously freed from fats by means of acetone or a solution of a more or less purified phosphatidyl choline. In particular it is possible to start from a solution containing 50 to 200 g., preferably about 100 g. of lecithin or crude phosphatidyl choline per litre.

After precipitation, the complex compound of magnesium sulphate and phosphatidyl choline is separated, for example by centrifuging, and dried; before drying it may be washed with ethanol to which a little methanol has been added.

The complex compound thus obtained is a new product, the composition of which may vary to some extent according to the origin of the starting lecithin and also the amount of magnesium sulphate employed. As a matter of fact the product may contain excess magnesium sulphate over the required amount for binding the whole amount of phosphatidyl choline in the starting material. Generally speaking the complex compound is a white powder, slightly hygroscopic, soluble in methanol and insoluble in most usual solvents, particularly ethanol and acetone; it is more soluble in cold methanol than in hot methanol.

The compound may be employed in dietetics and therapeutics, directly or after a further purification which may be effected by dissolving the compound in cold methanol and reprecipitating the same by means of ethanol. The compound may also be used as an emulsifying agent.

Furthermore, the product may be employed as a source of purified phosphatidyl choline, and for isolating the latter, the compound may be treated by water and a lecithin solvent by such an amount as to cause a separation into two layers, magnesium sulphate remaining in the aqueous layer while phosphatidyl choline remains in the solvent layer, from which it may be isolated according to a conventional technique.

With a view to isolating phosphatidyl choline from the complex compound, said compound may be treated according to a known process by means of ion exchangers, for example contacted with a mixture of an anion exchanger and a cation exchanger.

The compound may of course be prepared from a substantially pure phosphatidyl choline.

The following examples will illustrate the aspect of our invention described so far.

*Example 1*

To an ethanol solution of soya-bean lecithin previously freed from fats with acetone and containing 100 g. of dry extract including about 50 g. of phosphatidyl choline per litre of solution, a solution of $MgSO_4 \cdot 7H_2O$ in methanol (30 g. of $MgSO_4 \cdot 7H_2O$ in 100 ml. of ethanol) was added in the proportion of 500 g. of heptahydrated sulphate per 1000 g. of dry extract.

A precipitate of a complex compound of phosphatidyl choline and magnesium sulphate was formed. It was separated by centrifuging, washed twice with a small amount of ethanol to which 15 percent of methanol had been added, and dried at room temperature under a reduced pressure.

The yield was 52 g.

Analysis:                                      Percent
    Phosphorus _____ 2.74
    Total nitrogen _____ 1.45
    Phosphatidyl choline nitrogen _____ 1.20
    Magnesium sulphate _____ 28.00

*Example 2*

To an ethanol solution containing 200 g. of dry extract including 140–150 g. of purified phosphatidyl choline, a methanol solution of $MgSO_4 \cdot 7H_2O$ (30 g. of the latter in 100 ml. of methanol) was added in the proportion of 500 g. of heptahydrated sulphate per 750 g. of dry extract.

A precipitate of a complex compound of phosphatidyl choline and magnesium sulphate was formed. It was separated by centrifuging, washed twice with a small amount of ethanol to which 15 percent of methanol had been added, and dried at room temperature under a reduced pressure.

Dried to a constant weight, the compound weighed between 90 and 85 g. and was white and powdery; it corresponded to the following composition:

Percent
Phosphorus _____ 2.77
Total nitrogen _____ 1.33
Phosphatidyl choline nitrogen _____ 1.26
Magnesium sulphate _____ 22.5

*Example 3*

Ethanol was distilled off to dryness from the same solution as employed as starting material in Example 2, under a reduced pressure and a heating bath temperature not above 60° C.

The residue was taken up with enough methanol to yield a 20 percent solution, to which the same methanol solution of magnesium sulphate as in Example 2 was added. A precipitate occurred and was removed.

To the clear methanol solution, ethanol was added in the proportion of 4 litres per litre of solution.

A complex compound of phosphatidyl choline and magnesium sulphate precipitated and was separated as described in Example 2. The compound had the same composition as the compound obtained according to Example 2.

Generally speaking, although anhydrous or concentrated ethyl alcohol is preferred particularly from an economical standpoint, isopropanol may be substituted therefor.

We have further found that the process so far described may be still simplified, with a considerable economy of solvents.

According to a further aspect of our invention we employ phosphatidyl choline in the form of a concentrated ethanol solution thereof and magnesium sulphate as a concentrated aqueous solution thereof, the solutions are contacted together intimately for example by mixing and stirring the same, the mixture is contacted with acetone, then the precipitate which is formed is separated, for example by filtering or centrifuging.

The ethanol solution of phosphatidyl choline contains preferably 250 to 500 mg. of dry extract per ml., and the aqueous solution of magnesium sulphate preferably one part by weight of $MgSO_4 \cdot 7H_2O$ per 1.5 to 2 parts by weight of water.

The volume of acetone to be employed is preferably equal to about twice the sum of the volumes of water and ethanol employed as solvents for impure phosphatidyl choline and magnesium sulphate respectively.

With a view to purifying the precipitate, it is only necessary to wash it with acetone and dry it under a reduced pressure.

All operations are carried out preferably at room temperature.

Generally speaking, it is desirable to work under an atmosphere of an inert, neutral gas, particularly nitrogen, in view of the sensitiveness to oxidation of unsaturated fatty acids as form part of the starting phosphatidyl choline.

The following example will illustrate the aspect of our invention which has just been described.

*Example 4*

To a cold aqueous solution of 140 g. of $MgSO_4 \cdot 7H_2O$ in distilled water to make up 300 ml., 1000 ml. of an ethanol solution of partly purified lecithin containing 246 g. of dry extract was slowly added with constant stirring.

A thick paste was then obtained and was added by small portions to 2600 ml. of dry acetone while vigorously stirring with mechanical means.

A fairly stiff product was obtained and filtered off. It was again stirred with dry acetone until a homogeneous, powdery, white substance was obtained. The substance was drained to a maximum then dried under a reduced pressure (for example 100 mm. of mercury) at room temperature. The yield was 240–250 g.

Analysis:                                      Percent by weight
    Phosphorus _____ 2.89
    Total nitrogen _____ 1.32
    Phosphatidyl choline nitrogen _____ 1.10
    Magnesium sulphate _____ 27.7

What we claim is:

1. In a process for the production of a complex compound of magnesium sulphate and phosphatidyl choline, the steps of forming a methanol solution of magnesium sulphate and a phosphatidyl choline, and adding ethyl alcohol having a strength of at least 95 percent by volume to said methanol solution by an amount at least equal to the amount of methanol in said methanol solution, so as to cause precipitation of said complex compound.

2. In a process for the production of a complex compound of magnesium sulphate and phosphatidyl choline, the step of contacting together a phosphatidyl choline, magnesium sulphate and an alkanol selected from the class consisting of ethyl alcohol having a strength of at least 95 percent by volume and isopropanol.

3. The process of claim 1, in which the first step comprises adding a methanol solution of magnesium sulphate to a solution of phosphatidyl choline in ethyl alcohol having a strength of at least 95 percent by volume, the volume of said ethyl alcohol being greater than the volume of methanol in said methanol solution.

4. The process of claim 1, in which the first step comprises adding a methanol solution of magnesium sulphate to a methanol solution of phosphatidyl choline then removing the precipitate thereby formed.

5. In a process for the production of a complex compound of magnesium sulphate and phosphatidyl choline, the steps of adding a solution of magnesium sulphate in methanol to a solution of phosphatidyl choline in an ethyl alcohol having a strength of at least 95 percent by volume, said ethyl alcohol solution of phosphatidyl choline containing from 50 to 200 g. phosphatidyl choline per litre while said methanol solution of magnesium sulphate contains an amount of magnesium sulphate, reckoned as heptahydrated magnesium sulphate, not less than 50 percent of the weight of said phosphatidyl choline; then adding enough ethyl alcohol having a strength of at least 95 percent by volume to the mixture thus formed, to cause precipitation of said complex compound.

6. In a process for the production of a complex compound of magnesium sulphate and phosphatidyl choline, the steps of contacting a concentrated solution of phosphatidyl choline in ethyl alcohol having a strength of at least 95 percent by volume and a concentrated aqueous solution of magnesium sulphate; and introducing the mixture thus formed in acetone to cause precipitation of said complex compound.

7. In a process for the production of a complex compound of magnesium sulphate and phosphatidyl choline, the steps of making a homogeneous paste from a concentrated solution of phosphatidyl choline in ethyl alcohol having a strength of at least 95 percent by volume, said solution containing 250 to 500 mg. of dry extract per ml., and an aqueous solution of heptahydrated magnesium sulphate containing 1.5 to 2 parts by weight of water per each part by weight of said sulphate; and gradually adding said paste while stirring to a volume of acetone which is in the region of twice the total volume of ethyl alcohol and water employed as solvents in said solution, to cause precipitation of said complex compound.

8. The process of claim 2, said step being carried out under an atmosphere of inert, neutral gas.

9. A complex compound of magnesium sulphate and phosphatidyl choline, which is a white, powdery, slightly hygroscopic substance soluble in methanol, insoluble in ethanol and in acetone and has been prepared by forming a methanol solution of magnesium sulphate and phosphatidyl choline, adding ethyl alcohol having a strength of at least 95 percent by volume to said methanol solution by an amount at least equal to the amount of methanol in said methanol solution, so as to cause precipitation of said complex compound, separating said complex compound, and drying said compound until it has a constant weight.

References Cited in the file of this patent

UNITED STATES PATENTS

| | | |
|---|---|---|
| 1,968,252 | Genseke | July 1, 1934 |
| 2,117,776 | Tischer | May 17, 1938 |
| 2,242,188 | Thurman | May 13, 1941 |